United States Patent [19]
Miller

[11] 3,731,192
[45] May 1, 1973

[54] METHOD AND APPARATUS FOR ANALYZING SEMICONDUCTORS

[75] Inventor: Gabriel Lorimer Miller, Westfield, N.J.

[73] Assignee: Bell Telephone Laboratories, Incorporated, Murray Hill, Berkeley Heights, N.J.

[22] Filed: May 28, 1971

[21] Appl. No.: 147,846

[52] U.S. Cl. .......................... 324/158 D, 324/158 T
[51] Int. Cl. ............................................. G01r 31/26
[58] Field of Search ...................... 324/158 D, 158 T, 324/158 R, 73 R; 29/574

[56] References Cited

UNITED STATES PATENTS

| | | | |
|---|---|---|---|
| 3,605,015 | 9/1971 | Copeland | 324/158 D |
| 2,942,329 | 6/1960 | Rutz | 29/574 |
| 3,518,545 | 6/1970 | Copeland | 324/158 R |

OTHER PUBLICATIONS

Gold et al; "Determination of ... "; RCA Review; June 1960; pg. 245–252.

Meyer et al.; "Method for Measuring ..."; Proc. of the IEEE; Nov. 1963; pg. 1631–1637.

Copeland, J. A.; "A Technique ...", IEEE Trans. on Elect. Devices; vol. ED-16; No. 5; May 1969; pg. 445–449.

Spiwak, R. R.; "Design and ... "; IEEE Trans. on Instru. and Meas.; Vol. IM-18; No. 3; Sept. 1969; pg. 197–202.

*Primary Examiner*—Rudolph V. Rolinec
*Assistant Examiner*—Ernest F. Karlsen
*Attorney*—R. J. Guenther and Arthur J. Torsiglieri

[57] ABSTRACT

A semiconductor wafer is analyzed by applying successive values of reverse-bias voltage V to a diode region to form successive depletion layers of different depth X. Current of frequency $f_1$ is applied to the diode and detected to determine X. Voltage at frequency $f_2$, which is lower than $f_1$, is applied to the diode such as to produce a modulation $\Delta E_2$ of the electric field in the depletion layer and a modulation $\Delta X_2$ of the depletion layer depth. The voltage input at frequency $f_2$ is controlled to maintain either $\Delta E_2$ or $\Delta X_2$ constant with changes of X, and the modulation of the $f_1$ voltage at frequency $f_2$ is measured to determine one of these semiconductor parameters at different values of X. In this manner, a profile of semiconductor carrier density N, or its reciprocal 1/N, can be determined. An improved method of determining X is also disclosed.

14 Claims, 8 Drawing Figures

INVENTOR
G. L. MILLER
BY
*Roderick B. Anderson*
ATTORNEY

METHOD AND APPARATUS FOR ANALYZING SEMICONDUCTORS

BACKGROUND OF THE INVENTION

This invention relates to methods and apparatus for analyzing semiconductor wafers, and more particularly, to apparatus for determining a profile of the variation of carrier density with distance in a semiconductor wafer.

An important step in the fabrication of semiconductor devices and integrated circuits is a determination of the majority carrier distribution, also known as the doping density profile, in a semiconductor wafer. A small metal contact is typically bonded to a top surface of the wafer to form a Schottky barrier diode. A varying reverse-bias voltage is applied across the diode and the capacitance of the diode is measured as a function of bias voltage. The carrier density profile is related by a known expression to the capacitance and to the rate of change of capacitance with bias voltage, and is therefore determinable. However, the technique requires computation, either manually or by a computer, and is limited in resolution and numerical accuracy by the necessity to interpolate between two points to find the rate of change of capacitance.

A different approach is described in the U.S. Pat. of Copeland No. 3,518,545 issued June 30, 1970, and assigned to Bell Telephone Laboratories, Incorporated. The diode is reverse-biased, a constant A.C. current is directed through the diode, and first and second harmonic voltages across the diode are measured. It can be shown that the first harmonic voltage is proportional to the thickness of the diode depletion layer while the second harmonic voltage is proportional to the reciprocal of carrier density at the outer boundary of the depletion layer. By changing the reverse-bias voltage, the outer boundary of the depletion layer can be made to scan through the wafer thickness, and the reciprocal of carrier density can be determined at successive depth in the wafer. While the Copeland technique is clearly superior in most respects to conventional methods, I have devised a different alternative approach that offers several additional advantages.

SUMMARY OF THE INVENTION

In accordance with the present invention, a semiconductor wafer is analyzed by applying successive values of reverse-bias voltage V to a diode region, as in previous techniques, to form successive depletion layers of different depth X. Frequency $f_1$ current of constant magnitude is applied to the diode and the resulting diode voltage may be detected to determine depth X as in the Copeland technique. Voltage at a frequency $f_2$, which is lower than $f_1$, is applied to the diode such as to produce a modulation $\Delta E_2$ of the electric field in the depletion layer, and a modulation $\Delta X_2$ of the depletion layer depth. A major feature of the invention is predicated on the observation that, under these conditions, the carrier density N is a function of both $\Delta X_2$ and $\Delta E_2$. Thus, carrier density N may theoretically be determined by maintaining $\Delta X_2$ constant and measuring $\Delta E_2$, or conversely, maintaining $\Delta E_2$ constant and measuring $\Delta X_2$.

In practice, one of the two modulation parameters can conveniently be maintained constant with changes of depletion layer depth X by properly feeding back a portion of the energy directed through the diode region. In one embodiment, the low frequency $f_2$ voltage is controlled by the detected output at frequency $f_1$ so as to be proportional to the depletion layer depth X. It can be shown that, when the voltage at $f_2$ is proportional to X, the electric field modulation $\Delta E_2$ is constant with changes of X, and the reciprocal of the doping density is proportional to $\Delta X_2$. In turn, $\Delta X_2$ is a function of diode reactance, and its value can be determined by measuring the modulation of the $f_1$ signal across the diode at frequency $f_2$. More specifically, the magnitude of the modulation of the $f_1$ voltage at frequency $f_2$ is a measure of the reciprocal of the carrier density 1/N at the edge of the depletion layer.

In an alternative embodiment, the magnitude of the $f_2$ voltage is adjusted by a feedback loop in such a way as to keep $\Delta X_2$ constant. With $\Delta X_2$ constant, the magnitude of the electric field variation at frequency $f_2$ is proportional to N, the carrier density at the edge of the depletion layer.

In accordance with another feature of the invention, the capacitive component of the current through the diode is maintained at a constant value by phase detection, comparison of the resulting D.C. with a reference, and thereby generating a control signal to adjust the amplitude of the $f_1$ drive. This feedback technique yields a more dependable and accurate value of X because it does not require the approximation of a constant current source as a circuit element and, in addition, it is substantially independent of shunt resistive components of the diode impedance.

In another embodiment, the $f_1$ source operates a chopper which passes control signal current to the diode. With this arrangement, the control signal voltage itself may be taken as the voltage proportional to X, thereby avoiding the need for an accurate $f_1$ detector.

It will be seen that my method and apparatus offer the same advantages as the Copeland technique; that is, it is simple, accurate and permits a continuous or "real-time" indication of carrier density with respect to distance. In addition, it offers certain other advantages. For example, since it admits of phase locked detectors, the effects of possible drifts in oscillator frequencies are minimized. The spurious effects of leakage currents and stray reactances can be substantially reduced (allowing the device under test to be mounted at the end of long coaxial cables), and the system noise bandwidth can be most easily controlled.

These and other objects, features, and advantages of the invention will be better understood from a consideration of the following detailed description taken in conjunction with the accompanying drawing.

DRAWING DESCRIPTION

Figure 6:
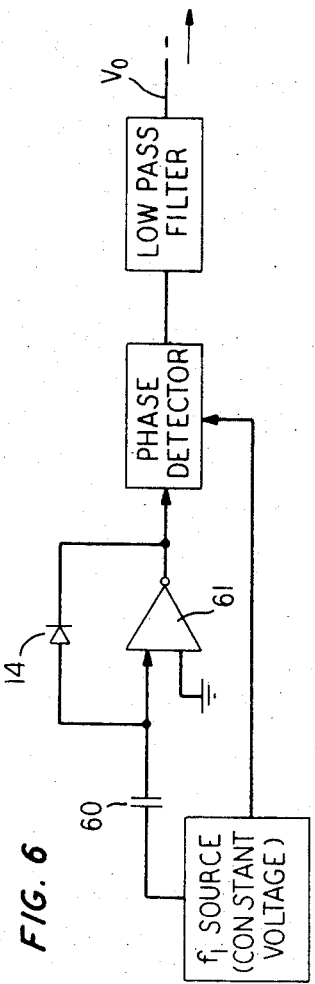
Figure 4:
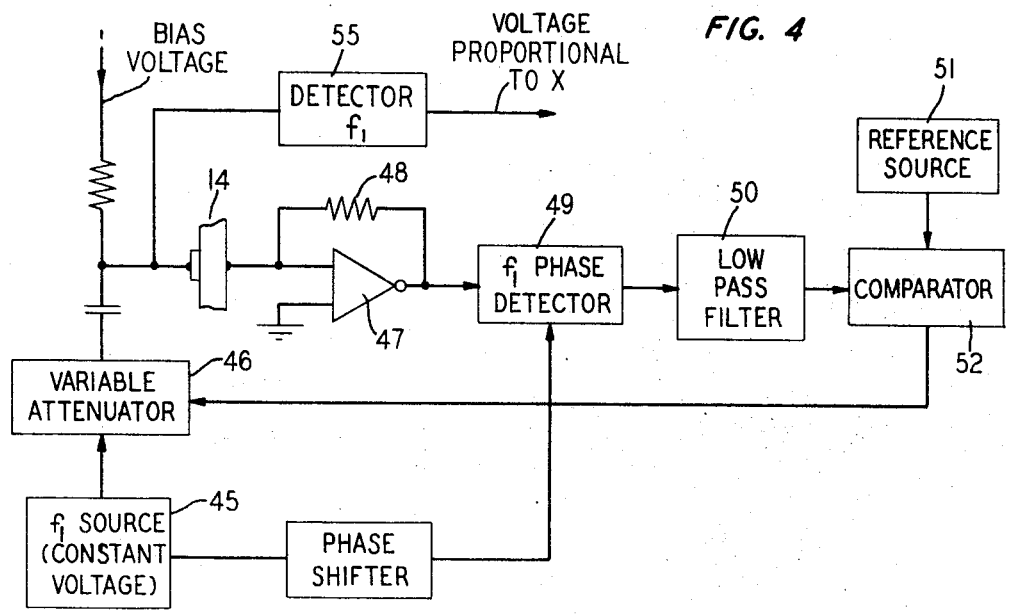
Figure 5:
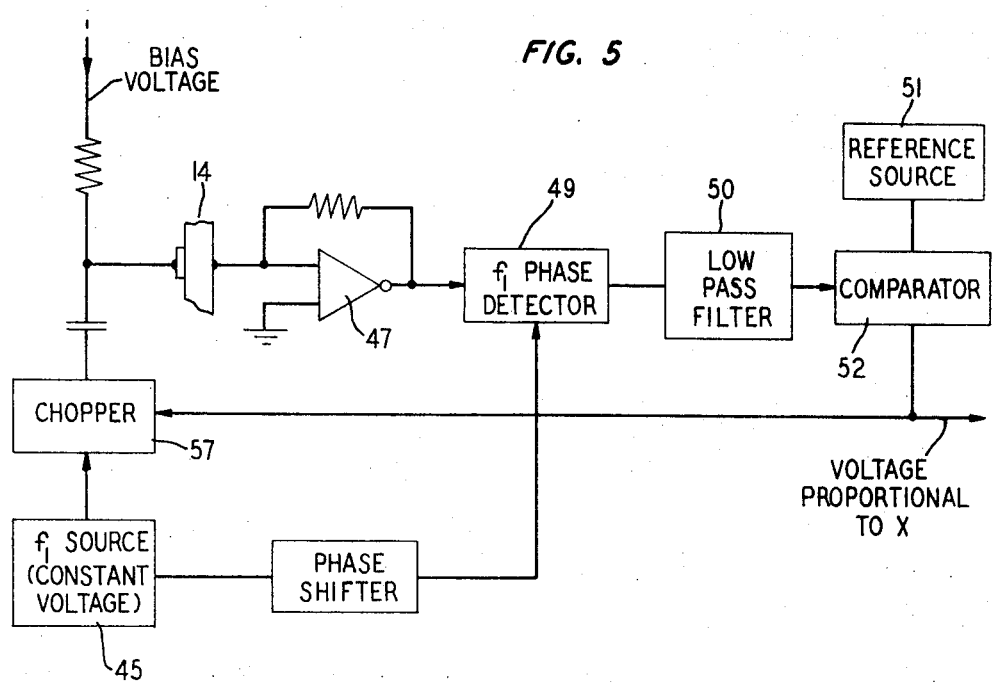
Figure 7:
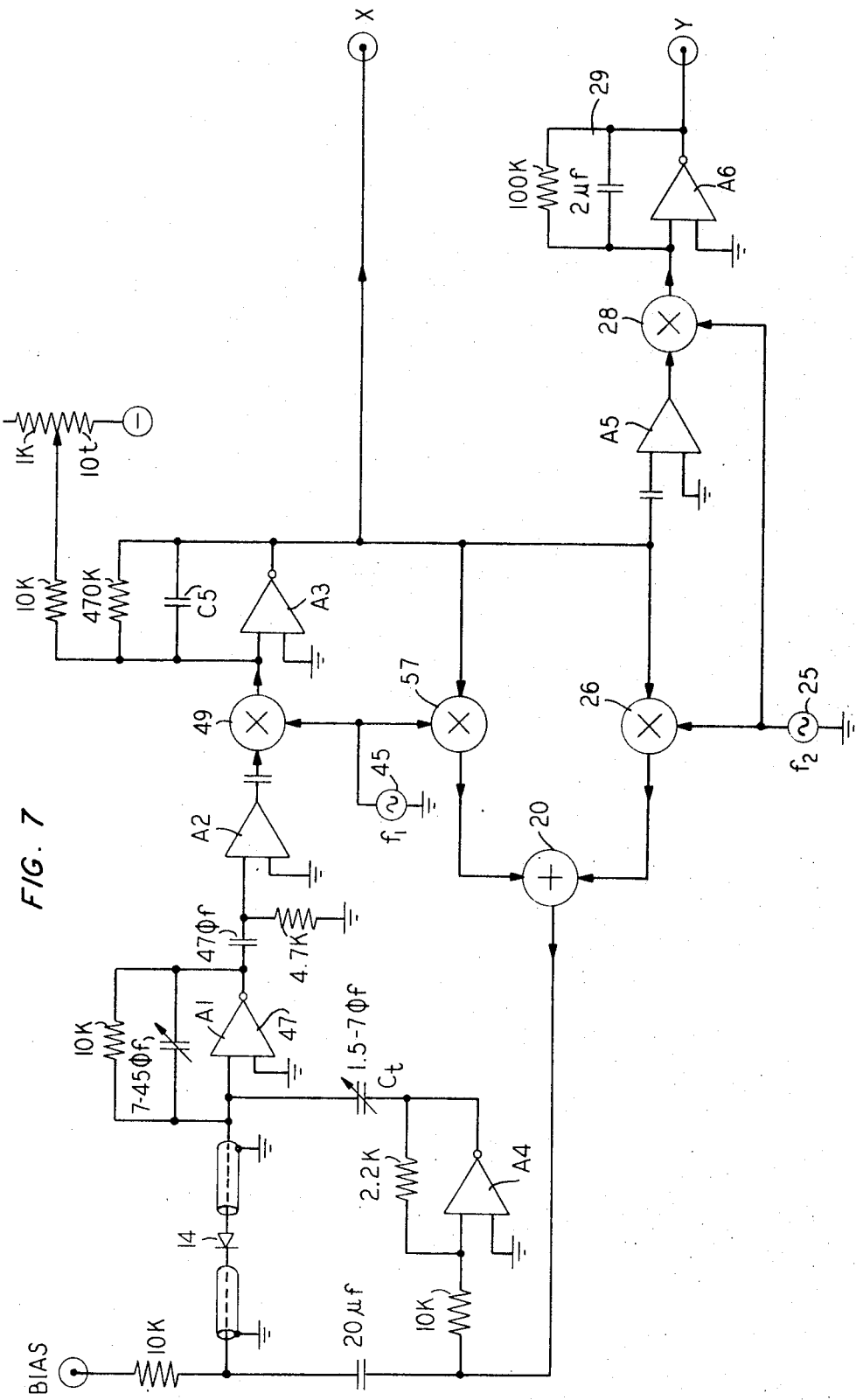

FIG. 4, 5, and 6 are block diagrams illustrating different methods for determining depletion layer depth by directing a constant A.C. current through a diode region; and FIG. 7 is a schematic diagram of a presently preferred embodiment of the invention.

DETAILED DESCRIPTION

Figure 1A:
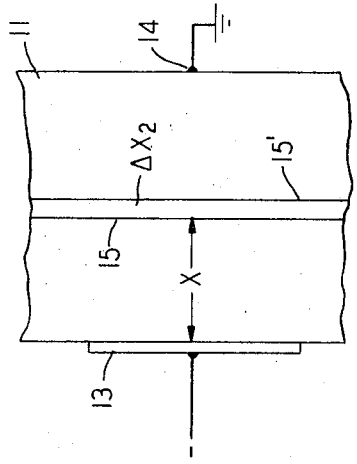
FIG. 1 is a schematic diagram of a diode region of part of a wafer that is being evaluated in accordance with an illustrative embodiment of the invention.
Figure 1B:
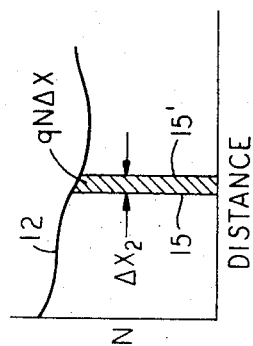

Referring now to FIG. 1 there is shown in section a portion of a semiconductor wafer 11 having a certain carrier density $N$ that varies as a function of distance $X$, as typically shown by curve 12. As a first step in determining curve 12, a Schottky barrier contact 13 is formed on one surface of the wafer to form a diode region 14. The diode region is reverse-biased to form a depletion layer having a thickness $X$. As with most such techniques, the present invention is a process for determining the carrier density at the boundary 15 of the depletion layer. By changing the reverse-bias voltage, the depletion layer thickness $X$ changes, causing boundary 15 to scan through the wafer to permit successive points on curve 12 to be determined.

In accordance with the invention, a low frequency voltage of frequency $f_2$ is applied to the diode region to cause an oscillation of the depletion layer boundary between locations 15 and 15'. During each cycle, the $f_2$ bias voltage of amplitude $\Delta V_2$ increases the electric field in the depletion layer by an amount $\Delta E_2$ given by the equation $$\Delta E_2 = \Delta V_2 / X. \quad (1)$$

The resulting increase in depletion layer thickness to $X + \Delta X_2$ must uncover an additional quantity of charge $qN \Delta X_2$ satisfying the relation $$\Delta E_2 = (q/k) N(X) \Delta X_2 \quad (2)$$

where $q$ is the charge on an electron, $k$ is the dielectric constant of the semiconductor, and $N(X)$ is the carrier density as a function of distance. From equation (2) the parameters $\Delta X_2$, $N$, and $\Delta E_2$ may be expressed by the relation, $$\Delta X_2 \propto \frac{1}{N(X)} \Delta E_2 \quad (3)$$

It is apparent from relationship (3) that, if $\Delta X_2$ were kept constant, $\Delta E_2$ would be proportional to $N$, whereas if $\Delta E_2$ were kept constant, $\Delta X_2$ would be proportional to $1/N$.

Figure 2:
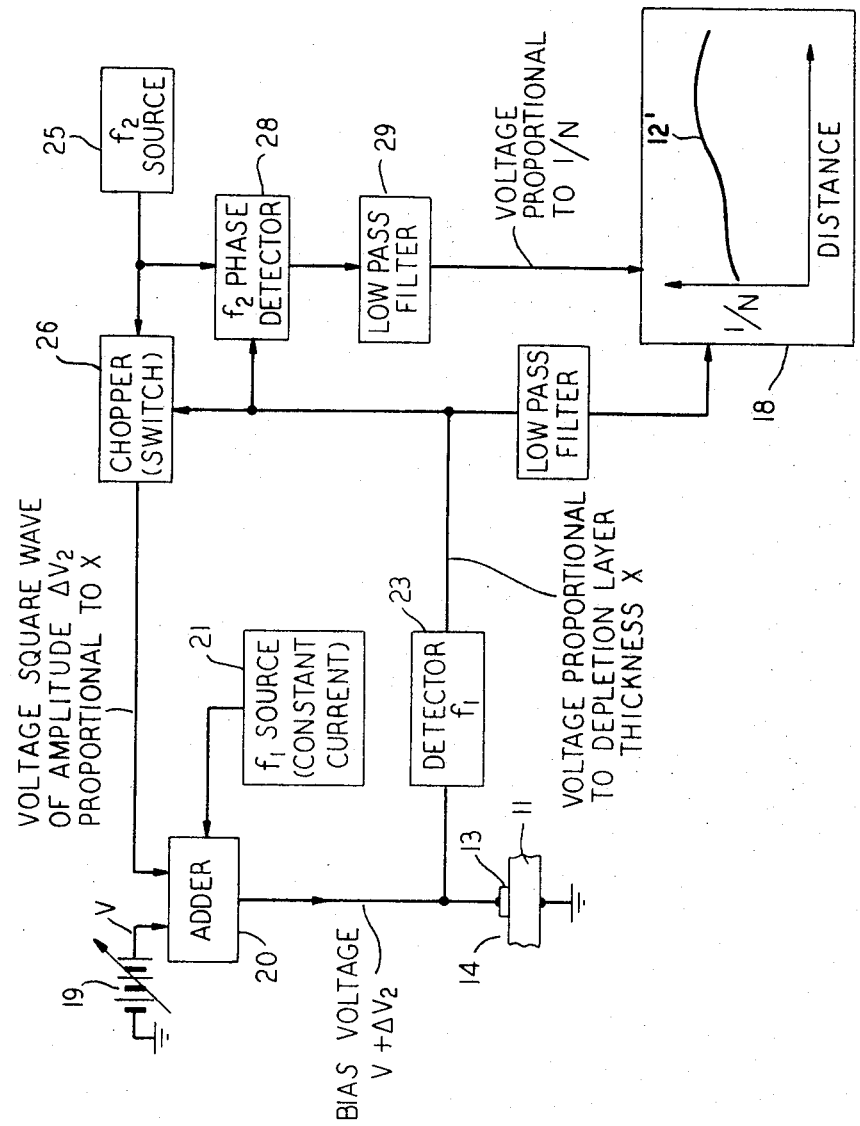
FIG. 2 is a functional block diagram of apparatus for evaluating a diode region of a semiconductor wafer in accordance with one embodiment of the invention.

Referring now to FIG. 2, there is shown a functional block diagram of apparatus for maintaining $\Delta E_2$ constant so that $\Delta X_2$ is directly proportional to $1/N$. As will be seen later, with $\Delta E_2$ constant, $1/N$ is determined by measuring the magnitude of the modulation of the $f_1$ signal at frequency $f_2$.

A diode portion 14 of a semiconductor wafer 11 is analyzed by driving an XY plotter 18 to generate a curve 12 of the reciprocal of carrier density variation with distance. A reverse-bias voltage $V$ is applied to the diode 14 by a source 19 via an adder 20. Also applied to the diode is constant-current A.C. energy of a high frequency $f_1$ from a source 21.

As is pointed out in the Copeland patent, if a constant A.C. current is directed into a diode, the impedance of the diode is a function of $X$, and the voltage at frequency $f_1$ across the diode is indicative of depletion layer thickness. A detector 23 converts the $f_1$ voltage to a D.C. voltage proportional to the distance $X$ as shown in the drawing. As will be explained later, this is not the preferred method of generating the D.C. voltage proportional to $X$, but merely serves as an illustration.

In accordance with the invention, the voltage proportional to $X$ is used to control the amplitude of a low frequency $f_2$ from a source 25 that is directed to the diode 14. A convenient method for obtaining an amplitude proportional to $X$ at frequency $f_2$ is to use the $f_2$ source 25 to operate a switch or chopper 26. Chopper 26 then periodically passes D.C. voltage from detector 23 to generate a square wave of frequency $f_2$ and an amplitude $\Delta V$ proportional to the depletion layer thickness $X$. This voltage is combined by adder 20 with the bias voltage $V$ to give a combined bias voltage $V + \Delta V_2$. The incremental voltage $\Delta V_2$ of course results in the incremental depletion layer thickness $\Delta X_2$ and incremental electric field $\Delta E_2$ referred to before. It is important that the frequency $f_2$ be small compared to $f_1$; for example, $f_2$ may be 100 cps with an $f_1$ frequency of 1 megahertz.

During the analysis of the wafer 11, the variable bias source 19 is operated to give successively larger D.C. reverse-bias voltages $V$, with successively thicker depletion layers. As the depletion layer thickness $X$ increases, $\Delta V_2$ increases proportionately. Thus, by equation (1), the modulation parameter $\Delta E_2$ is maintained constant. Then, by equation (3), the incremental distance $\Delta X_2$ depicted in FIG. 1 is proportional to $1/N$. Since the incremental distance $\Delta X_2$ modulates the diode impedance, its value can be determined by measuring the magnitude of the modulation of the $f_1$ voltage across the diode at frequency $f_2$.

The magnitude of the modulation of the $f_1$ signal is detected by the combination of phase detector 28 and low pass filter 29 which together generate a D.C. voltage proportional to the magnitude of the voltage at frequency $f_2$. The output voltage of filter 29 is then proportional to the parameter $1/N$ and constitutes the Y input to the XY plotter 18.

It should be noted that using phase detector 28 to detect the magnitude of the frequency $f_2$ voltage offers substantial advantages over other detection methods because it is insensitive to signals at frequencies other than $f_2$ and, in addition, the post-detection filter 29 defines the system bandwidth in a very convenient way. Further, phase detection reduces the sensitivity of the apparatus to oscillator frequency variations; i.e., both inputs to phase detector 28 track any frequency deviation of source 25 to give an accurate output to the plotter 18.

Figure 3:
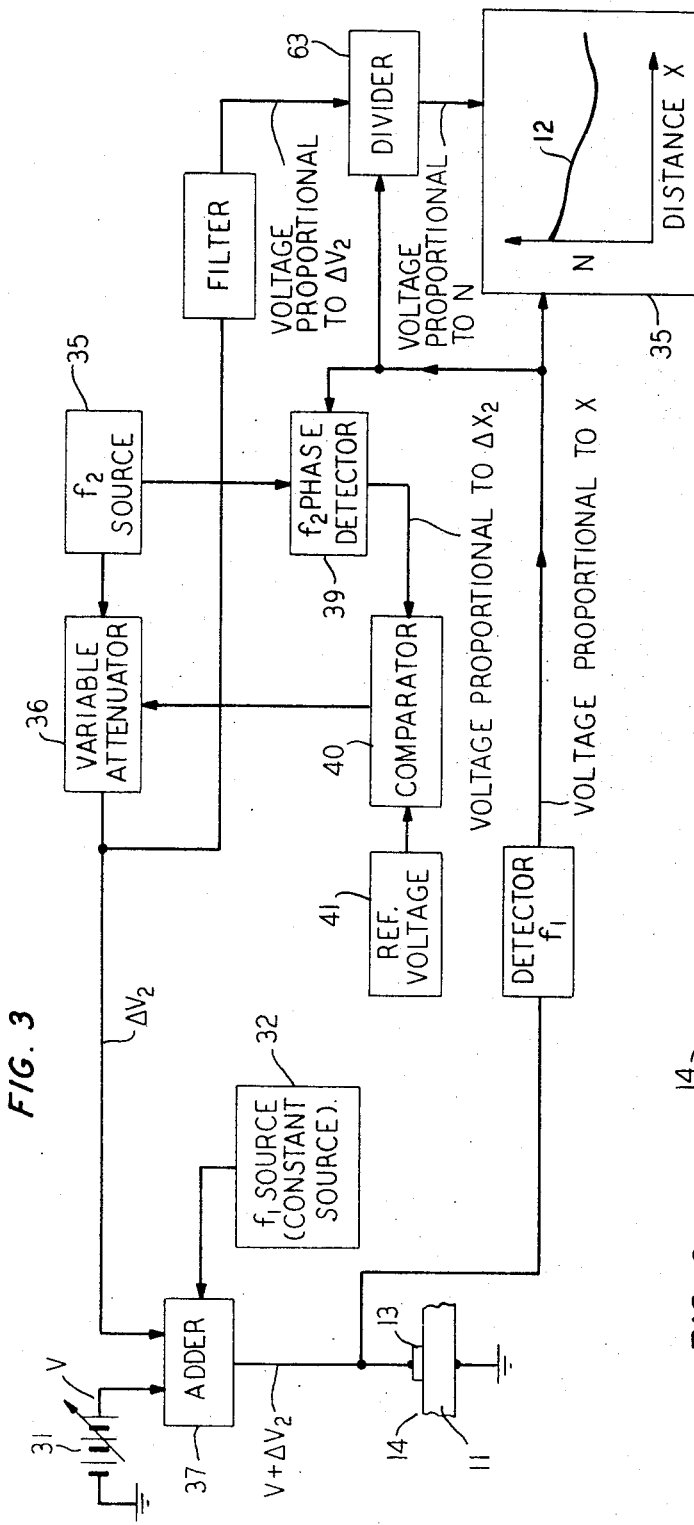
FIG. 3 is a functional block diagram of apparatus for analyzing a semiconductor wafer in accordance with another embodiment of the invention.

FIG. 3 shows an alternative method of generating a carrier density profile in which the modulation parameter $\Delta X_2$ is maintained constant with changes of depletion layer thickness $X$. As before, the D.C. bias from a source 31 is varied to give a changing depletion layer thickness $X$ which is determined by detecting the voltage across the diode region at frequency $f_1$.

A low frequency component is added to the diode bias from a source 35 via a variable attenuator 36 and an adder 37. The $f_2$ modulation again produces the modulation $\Delta X_2$ of the depletion layer thickness in the diode, and the resulting modulation of the $f_1$ voltage across the diode at frequency $f_2$ is indicative of $\Delta X_2$. The low frequency $f_2$ signal is detected by a phase detector 39 which generates an output proportional to $\Delta X_2$.

The output of detector 39 is directed to a comparator 40 which compares it with a reference voltage from a source 41. The output of the comparator 40 drives the variable attenuator 36 which controls the magnitude of $f_2$ current directed through the diode. The comparator 40 is essentially a subtracting device, its output being proportional to the difference between the reference voltage and the voltage proportional to $\Delta X_2$. Hence, since the reference voltage is constant, its effect is to control the output $\Delta V_2$ of variable attenuator 36 such as to maintain a constant modulation $\Delta X_2$ with changes in the depletion layer thickness X.

With $\Delta X_2$ constant, $\Delta E_2$ is directly proportional to the carrier density N, by equation (3). $\Delta V_2$ is in turn indicative of $\Delta E_2$ by equation (1), and so $\Delta V_2$ may be divided by X, using an analog divider 63, to provide a voltage proportional to N for display by the XY plotter, as shown in the drawing.

Feedback can similarly be used to maintain the constant $f_1$ current required for dependably developing a voltage proportional to X. As is pointed out in the Copeland patent, a constant current source can only be approximated; and therefore the sources 21 and 32 of FIG. 2 and 3 are inherently subject to error. FIG. 4 and 5 are circuits for providing a constant $f_1$ current through the diode region by controlling the magnitude of $f_1$ voltage across the diode.

In FIG. 4, $f_1$ current from a constant voltage source 45 is directed to the diode of region 14 via a variable attenuator 46. A high gain amplifier 47 causes virtually all of the diode current to flow through a resistor 48. The $f_1$ current through the diode is detected by a phase detector 49 and a smoothing filter 50, and compared to a reference voltage from a source 51 in a comparator 52. If the $f_1$ current deviates from the reference value, an error signal is fed back to the variable attenuator 46 to control the voltage delivered from source 45. In this way, the capacitive component of the current through the diode 14 is maintained at a constant value.

By principles known in the art, the input to high gain amplifier 47 is at a virtual ground potential. As a result, the entire $f_1$ voltage across the diode region appears at the input to the diode region; thus, $f_1$ voltage detected by a detector 55 is indicative of depletion layer thickness X as shown.

It would additionally be desirable to eliminate the $f_1$ detector 55, and in theory this could be done by taking the output of comparator 52 as being indicative of X. This will work, however, only if the variable attenuator 46 has a linear response. A better design is shown in FIG. 5 which operates in essentially the same way except that $f_1$ source 45 is used to drive a chopper 57. The effect of this is to feed back through the diode a portion of the comparator output but converted to frequency $f_1$ by chopper 57. The current through the diode at frequency $f_1$ is constant, as before. The voltage at the output of the comparator required to keep the $f_1$ diode current constant depends on the diode depletion layer width, and can therefore be taken as being proportional to X as shown.

The elimination of $f_1$ detector 55 of FIG. 4 from the circuit of FIG. 5 is of significant importance because it circumvents the problem of detector linearity in providing the X signal. Detection in the circuit of FIG. 5 is by phase detector 49, and consequently if the frequency of $f_1$ should vary detector 49 tracks such variations. In addition, the system is only sensitive to the capacitive part of the current flowing through device 14. Because of these advantages, the circuit of FIG. 5 is presently the preferred method of generating the voltage proportional to X required by the invention.

FIG. 6 shows still another alternative method of generating an output voltage proportional to X. With the diode 14 connected in parallel with the high gain amplifier 61, as shown, the output voltage $V_0$ can be shown to be given by:

$$V_0 = (Z_2/Z_1) V_1 \quad (4)$$

where $Z_2$ is the impedance of diode 14, $Z_1$ is the impedance of capacitor 60, and $V_1$ is the constant voltage output of the $f_1$ source. With $Z_1$ and $V_1$ being constant the output voltage $V_0$ is directly proportional to the diode impedance $Z_2$, which, in turn, is proportional to depletion layer thickness X. Thus, the output voltage $V_0$ can be calibrated in terms of X. This embodiment is not preferred, however, because spurious diode shunt resistances can have the effect of reducing the magnitude of bias changes $\Delta V_2$ seen by the diode, which leads to difficulties in interpretation of the profile data.

FIG. 7 is a circuit diagram of a wafer analyzing circuit that has been built incorporating the circuit of FIG. 5 (for generating the X output) with the circuit of FIG. 2 (for generating the Y output). Reference numerals from FIGS. 5 and 2 are included in FIG. 7 for assistance in tracing the circuit functions. The circuit incorporates numerous design features which, for the sake of brevity, will not be described or explained. The values of the various circuit elements are designated by the accepted notations: pf = picofarads, $\mu$f = microfarads, K = kilohms. The frequency $f_1$ was 0.7 megahertz, and $f_2$ was 150 hertz. Noteworthy features of the FIG. 11 circuit are as follows:

1. Since phase detection is employed, the system is substantially independent of shunt resistive components of the diode current.

2. No complex analog operations are involved; only linear amplifiers and switches are employed in deriving both X and 1/N.

3. Since the system is phase locked, it is substantially independent of drifts of the oscillator frequencies.

4. Capacitances at the input of amplifier 47, or at the output of the low impedance adder 20, are of little consequence, and so the diode can be mounted at the end of long coaxial cables if desired.

5. The effect of stray shunt capacitance across the diode under test can be removed by adjusting capacitor $C_t$ following the inverting amplifier A4.

6. The electronics are relatively simple, requiring the use of only medium speed operational amplifiers, together with field effect transistor switches for the choppers and phase detectors.

Many tests have been made using the circuit of FIG. 7 on devices having known doping profiles. Accuracy and long term stability have been shown to be excellent. A number of different experiments have been carried out, such as "on-line" monitoring of radiation damage during accelerator implantations. Such experiments have been much more difficult or impossible using other doping profiling techniques.

The various embodiments and procedures described are considered to be merely illustrative of the inventive concepts involved. Numerous other embodiments and modifications may be made by those skilled in the art without departing from the spirit and scope of the invention.

What is claimed is:

1. A process for analyzing a semiconductor wafer comprising the steps of:
    forming a diode region in the wafer;
    successively applying different values of reverse-bias voltage V to the diode region, thereby forming successive depletion layers of different depth X;
    applying a constant A.C. current of frequency $f_1$ to the diode region;
    detecting the voltage across the diode region at frequency $f_1$, said voltage being indicative of the depletion layer depth X;
    applying a voltage of frequency $f_2$ to the diode region, said frequency $f_2$ being small compared to $f_1$, said voltage resulting in a modulation parameter $\Delta X$ equal to the variation in depletion layer depth, and a modulation parameter $\Delta E$ equal to the variation of electric field in the depletion layer;
    maintaining one of the modulation parameters constant with changes of depletion layer depth X, and detecting the modulation of the $f_1$ signal at frequency $f_2$ for different values of bias voltage V, thereby to evaluate the diode region at different depths.

2. The process of claim 1 wherein:
    the step of maintaining a modulation parameter constant comprises the step of using said voltage at frequency $f_1$ to control the voltage at frequency $f_2$.

3. The process of claim 2 wherein:
    the step of detecting frequency $f_1$ voltage comprises the step of generating a D.C. voltage proportional to the detected frequency $f_1$ voltage; and
    the step of controlling $f_2$ voltage comprises the step of causing the D.C. voltage to be interrupted at frequency $f_2$, whereby the applied diode region voltage $V + \Delta V_2$ maintains a constant modulation parameter $\Delta E$ with changes of X, and the detected $f_2$ voltage is indicative of the reciprocal of carrier density 1/N at the edge of the depletion layer.

4. The process of claim 3 wherein:
    the $f_2$ voltage across the diode is detected by phase detection.

5. The process of claim 2 wherein:
    the step of detecting frequency $f_1$ comprises the step of generating a D.C. voltage $\Delta V$ proportional to the detected $f_1$ voltage; and
    the step of modulating frequency $f_2$ energy comprises the step of comparing $\Delta V$ with a reference voltage, generating a control signal proportional to the difference of the reference voltage and $\Delta V$, and controlling the amplitude of frequency $f_2$ with said control signal, whereby the parameter $\Delta X$ is maintained constant at changing values of X and the detected $f_2$ voltage is indicative of carrier density N at the edge of the depletion layer.

6. The process of claim 2 wherein:
    the step of applying to the diode region a constant A.C. current at frequency $f_1$ comprises the steps of comparing $f_1$ current through the diode with a reference current to generate a control signal, and controlling said $f_1$ current with said control signal.

7. The process for measuring the free carrier density in a semiconductor diode region comprising the steps of:
    applying a bias voltage V to the diode, thereby establishing a depletion region in the diode of depth X
    generating a voltage $\Delta V$ proportional to X;
    adding $\Delta V$ to V and applying to the diode a bias voltage $V + \Delta V$, thereby establishing a depletion region of depth $X + \Delta X$; and
    measuring the parameters X and $\Delta X$ thereby to determine respectively the depletion region depth X and the reciprocal of free carrier density 1/N at the edge of the depletion region.

8. The process of claim 7 wherein:
    the step of measuring the distance X comprises the step of applying to the diode a constant A.C. current of frequency $f_1$; and
    detecting the amplitude of the voltage across the diode region at frequency $f_1$, said amplitude being indicative of the depletion region depth X.

9. The process of claim 8 wherein:
    the step of measuring $\Delta X$ comprises the steps of adding voltage $\Delta V$ to bias voltage V intermittently at a frequency $f_2$, and detecting the amplitude of the modulation of frequency $f_1$ across the diode region at frequency $f_2$, said amplitude being indicative of the parameter 1/N 10. The process of claim 8 further comprising the steps of:
    applying progressively different bias voltages V to the diode region; and
    repeating said steps after applying each different bias voltage, thereby to determine the reciprocal of the free carrier density at a succession of different depletion layer depths and to determine a carrier density profile of the diode region.

11. The process of claim 10 wherein:
    the frequency $f_2$ is much smaller than $f_1$.

12. The process of claim 10 wherein:
    the step of applying to the diode region a constant A.C. current at frequency $f_1$ comprises the steps of comparing $f_1$ current through the diode with a reference current to generate a control signal, and controlling said $f_1$ current with said control signal.

13. The process of claim 10 wherein:
    the step of applying to the diode region A.C. current frequency $f_1$ comprises the steps of comparing $f_1$ current through the diode region with a reference current to generate a control current, causing said control current to be interrupted at frequency $f_1$, and directing said interrupted control current through the diode region.

14. The process for determining a profile of the free-carrier density in a semiconductor diode region comprising the steps of:
    successively applying different values of bias voltage of V to the diode region, thereby to form successive depletion layers of different depth X;
    applying A.C. current of frequency $f_1$ to the diode region detecting the $f_1$ frequency voltage across the diode region;

measuring the $f_1$ frequency voltage at different values of bias voltage V to determine corresponding values of depletion layer depth X:

applying A.C. voltage of frequency $f_2$ to the diode region, the $f_2$ frequency being significantly smaller than $f_1$, and resulting in a modulation $\Delta X_2$ of the depletion layer depth and in modulation $\Delta E_2$ of the electric field in the depletion layer;

maintaining the electric field modulation $\Delta E_2$ substantially constant, comprising the step of generating a voltage $\Delta V$ proportional to depletion layer depth X and using said voltage $\Delta V$ to control the magnitude of applied frequency $f_2$ voltage; and measuring frequency $f_2$ modulation of the $f_1$ voltage across the diode region at different values of bias voltage V to determine the carrier density reciprocal 1/N at successive depths in the diode region.

* * * * *